United States Patent [19]
Lyles, Sr. et al.

[11] Patent Number: 6,074,557
[45] Date of Patent: Jun. 13, 2000

[54] WATER TREATMENT DEVICE AND METHOD

[76] Inventors: Robert G. Lyles, Sr., 140 Ray Pardue Rd., Duson, La. 70529; John A. Bibaeff, 117 Castle Row, Lafayette, La. 70503

[21] Appl. No.: 09/016,915

[22] Filed: Feb. 2, 1998

(Under 37 CFR 1.47)

[51] Int. Cl.$^7$ .............................. C02F 1/24; C02F 1/40; C02F 9/00; B01D 17/035
[52] U.S. Cl. ...................... 210/221.2; 210/112; 210/194; 210/221.1; 210/260; 210/294; 210/320; 210/521
[58] Field of Search ................................ 210/221.2, 320, 210/194, 112, 294, 259, 260, 522, 221.1, 521

[56] References Cited

U.S. PATENT DOCUMENTS

| | | |
|---|---|---|
| 2,766,203 | 10/1956 | Brown . |
| 4,151,075 | 4/1979 | Othmer . |
| 4,564,457 | 1/1986 | Cairo . |
| 4,800,025 | 1/1989 | Bibaeff . |
| 4,824,579 | 4/1989 | George . |
| 4,983,287 | 1/1991 | Arnold . |
| 4,986,903 | 1/1991 | Canzoneri et al. ........................ 210/90 |
| 5,120,435 | 6/1992 | Fink . |
| 5,158,678 | 10/1992 | Broussard, Sr. ..................... 210/221.1 |
| 5,173,184 | 12/1992 | Krieger ................. 210/195.1 |
| 5,186,728 | 2/1993 | Fong ........................................ 55/90 |
| 5,202,031 | 4/1993 | Rymal, Jr. ............... 210/703 |
| 5,277,803 | 1/1994 | Broussard, Sr. ..................... 210/221.1 |
| 5,288,737 | 2/1994 | Krieger ................. 210/195.1 |
| 5,310,481 | 5/1994 | Rondano ................................... 210/86 |
| 5,376,266 | 12/1994 | Broussard ........................... 210/195.1 |
| 5,423,981 | 6/1995 | Krieger ................. 210/195.1 |
| 5,445,730 | 8/1995 | Pattee ...................................... 210/167 |
| 5,484,534 | 1/1996 | Edmondson ........................... 210/703 |
| 5,516,434 | 5/1996 | Cairo, Jr. et al. ..................... 210/703 |
| 5,534,159 | 7/1996 | Krieger ................. 210/704 |
| 5,543,043 | 8/1996 | Bates et al. .......................... 210/221.2 |
| 5,591,347 | 1/1997 | Cairo, Jr. et al. ..................... 210/703 |
| 5,609,769 | 3/1997 | Krieger ................. 210/704 |
| 5,656,173 | 8/1997 | Jordan et al. ........................... 210/703 |

FOREIGN PATENT DOCUMENTS

| | | |
|---|---|---|
| 96/12678 | 5/1996 | WIPO . |

OTHER PUBLICATIONS

A "Produced Water Treatment Unit Bid Form" from Blue Water Enviromental, Inc. to Mobil Technology dated Jan. 24, 1998 ("A").

Various correspondence between Mobil Producing Nigeria Ultd. and Blue Water Environment ( "B").

Primary Examiner—Thomas M. Lithgow
Attorney, Agent, or Firm—Domingue & Waddell, PLC

[57] ABSTRACT

An apparatus for separating contaminants from a fluid stream is disclosed. The apparatus comprises a vessel containing a gas blanket. The apparatus will have contained therein a water skimmer member adapted for allowing for retention of the fluid stream. The apparatus further includes a first gas flotation cell contained within the vessel and arranged in series with the water skimmer so as to receive the fluid stream. Also included is an oil bucket positioned within the vessel and adapted to receive a portion of the fluid stream from the water skimmer and the first gas flotation cell. In one embodiment, the first gas flotation cell comprises a first screen member having a porous structure, a plate baffle having a first passage therein, and an eductor device adapted for introducing a gas stream into the fluid stream. In the preferred embodiment, the eductor device comprises a tube operatively associated with the vessel, the tube being in communication with the fluid stream; a nozzle member positioned within the tube and adapted to receive the fluid stream; a port formed on the tube and adapted to receive the gas contained within the gas blanket and introduce the gas into the elongated tube; and, a rotor member positioned within the tube and adapted to produce a properly sized and dispersed gas bubble array. Also, the apparatus may contain a plurality of gas flotation cells arranged in series so that the outlet of one feeds the inlet of another. A method of treating a fluid stream is also disclosed which utilizes the apparatus herein disclosed.

12 Claims, 8 Drawing Sheets

WATER TREATMENT DEVICE AND METHOD

BACKGROUND OF THE INVENTION

This invention relates to an apparatus and method for treating a fluid stream. More particularly, but not by way of limitation, this invention relates to an apparatus and method for removing contaminants, such as oil, from an effluent.

In the oil and gas industry, the production of oil and gas from subterranean reservoirs entails the production of insitu waters. Separation of the three phases (namely: oil, gas and water) is necessary for proper handling. The process of separating the produced water is complicated and costly. Government regulations require that the separated water contain only trace amounts of contaminants such as oil. Once properly separated, the water requires suitable disposal.

The production facilities may be located in remote areas and/or in offshore waters. Many prior art devices have been designed to separate the oil and water. Even water that has been separated in a prior art separators may contain small amounts (100 to 2,000 mg/L) of suspended hydrocarbons in oil droplet form. The physical diameters of the oil particles may be very small.

Stokes Law describes the buoyant rise velocity of an oil droplet in a water-continuous phase. It has been shown that the larger the size of an oil droplet, the greater its vertical velocity. A common prior art device used for treatment equipment is a water skimmer tank. This type of tank is designed to provide large residence times during which coalescence and gravity separation can occur. This type of separator is usually used in combination with other types of devices such as three-phase separators.

Other types of devices have been useful in separating fine oil particles from water. One technique has been to use the gas flotation device. One such device is seen in U.S. Pat. No. 4,800,025 entitled "APPARATUS AND PROCESS FOR THE GAS FLOTATION PURIFICATION OF OIL-CONTAMINATED WATER" and assigned to applicant; nevertheless, while this gas flotation device is very useful, there remains a need for an improved apparatus for separating oil and water. For instance, operators will use various other separating devices to more completely separate the oil from the water. However, in the remote areas where space is a critical factor, the physical placement of said devices causes problems. Operators attempt to minimize the amount of equipment while at the same time maximize the separation efficiency.

Therefore, there is a need for a device that will increase the efficiency of contaminated effluent separation. There is also a need for a system that will separate an oil-water mixture that minimizes space. Other needs will be met by the teachings and disclosures of this invention, as will be more fully understood by a reading of the following description.

SUMMARY OF THE INVENTION

An apparatus for separating contaminants from a fluid stream is disclosed. The apparatus comprises a vessel containing an internal chamber and a gas blanket. The apparatus will have contained within the chamber a water skimmer means for allowing for retention of the fluid stream. The water skimmer means has disposed therein a fluid inlet adapted to receive the fluid stream and a fluid outlet adapted to release the fluid stream. The apparatus further includes a first gas flotation cell contained within the internal chamber and arranged in series with the water skimmer so as to receive the fluid stream. Also included is an oil bucket positioned within the vessel and adapted to receive a portion of the fluid stream from the water skimmer means and the first gas flotation cell.

In one embodiment, the first gas flotation cell comprises a first screen member having a permeable structure, a plate baffle having a first passage therein, and an eductor means for introducing a gas stream into the fluid stream. In the preferred embodiment, the eductor means comprises a tube operatively associated with the vessel, the tube being in communication with the fluid stream; a nozzle member positioned within the tube and adapted to receive the fluid stream; a port formed on the tube and adapted to receive the gas contained within the gas blanket and introduce the gas into the elongated tube; and, a rotor member positioned within the tube and adapted to disperse the gas within the tube.

The water skimmer means may include means for coalescing the oil contained within the water skimmer. In the preferred embodiment, the volume of the water skimmer is sufficient to allow retention of fluid stream for approximately 20 minutes. In the preferred embodiment, the coalescing means comprises a permeable member positioned within the vessel and adapted so that the fluid stream flows through the permeable member causing coalesce of the oil particles contained within the fluid stream. The permeable member may be constructed of a plastic having a plurality of interconnected channels therethrough giving the member a porosity.

In the preferred embodiment, the apparatus will include a header manifold operatively associated with the tube member; and, pump means, operatively associated with the fluid stream outlet, for receiving the fluid stream from the fluid outlet and pumping the fluid stream to the header manifold. The apparatus may further include an outlet valve connected to the vessel outlet; level controller means, operatively associated with the vessel outlet, for measuring the level of the fluid stream within the vessel and producing a signal once the fluid stream level reaches a predetermined level; dump valve controller means, connected to the outlet valve, for receiving the output signal from the level controller means and opening the outlet valve so that the fluid stream exits the vessel.

In the preferred embodiment, the apparatus may contain a plurality of gas flotation cells. The gas flotation cells will be arranged in series so that the outlet of one of the cells feeds the inlet of the next succeeding cell.

In the preferred embodiment, the rotor member comprises a first collar operatively adapted to the container; a first shaft having an axes and wherein one end of the shaft is rotably connected to the collar and the other end of the shaft is rotably connected to the collar; and, a first blade attached to the first shaft. The blade may be a circular band blade. In this embodiment, the first circular blade is rotated with the first shaft. The rotor member further contains a second blade attached to the first shaft, and wherein said second blade is rotated with the first shaft. The blade may be a circular band blade. In the preferred embodiment, the first blade contains a first projection extending therefrom and said second blade contains a second projection extending therefrom.

The eductor may further include a second rotor positioned in series with the first rotor. The second rotor comprises a second collar operatively adapted to the container, a second shaft that is rotably connected to the second collar, and a third blade. The third blade may be a circular blade attached to the second shaft. The third blade is rotated within the collar with second shaft.

A method of treating a fluid stream is also disclosed. The fluid stream will contain a water content and a contaminant such as oil. The method comprises introducing the fluid stream into a vessel. The vessel will contain a gas blanket; means, adapted within the vessel, for allowing for retention of the fluid stream; a first gas flotation cell contained within the vessel; an oil bucket positioned within the vessel and adapted to receive a portion of the fluid stream from the water skimmer means and the first gas flotation cell.

The method includes flowing the fluid stream into the water skimmer means and coalescing the oil within the water skimmer means. The fluid stream is directed through the first gas flotation cell and the oil in the fluid stream is coalesced within the gas flotation cell. Thereafter, the fluid stream is flowed from the vessel at the outlet. The method may further include recirculating the fluid stream that exited from the outlet back into the water skimmer means as well as recirculating the fluid stream that exited from the outlet into the first gas flotation cell.

In the preferred embodiment, the water skimmer means contains a first eductor means for introducing a gas into the fluid stream and the first gas flotation means contains a second eductor means, and wherein the step of coalescing includes the steps of channeling the fluid stream into the first eductor means. At essentially the same time, the gas within the gas blanket will be funneled into the first port. The gas and fluid is mixed within the eductor and is further agitated within the rotor so that a properly sized and spaced gas bubble array is produced. The gas and fluid will be injected into the fluid stream within the water skimmer cell so that a gas bubble is created. The oil and water is separated within the water skimmer cell.

The step of coalescing further includes channeling the water into the second eductor means which in turn causes the gas to be funneled into the second port. This action creates a properly sized and spaced gas bubble array within the water skimmer and gas flotation cell so that the gas bubbles rise to the surface which in turn separates the oil and water within the fluid stream.

In one embodiment, the vessel further contains a liquid level measuring means for measuring the fluid stream level and producing a signal once a predetermined fluid stream level has been reached. Thus, the method further comprises measuring the fluid stream level and producing a signal once the fluid stream reaches the predetermined level. The fluid stream may then be discharged from the vessel.

The vessel may contain a second, third and fourth flotation cell arranged in series. The method would, therefore, further include flowing the fluid stream from the first flotation cell into the second flotation cell. Thereafter, the fluid stream is flowed from the second flotation cell into the third flotation cell, and thereafter, flowing the fluid stream from the third flotation cell into the fourth flotation cell.

The vessel may also contain an embodiment wherein the baffle of the first flotation cell has a first passage, the baffle of the second flotation cell has a second passage, the baffle of the third flotation cell has a third passage, and the baffle of the fourth flotation cell has a fourth passage, and wherein the first, second, third and fourth passages are offset relative to each other. The method further comprises flowing the fluid stream from the first flotation cell into the second flotation cell so that the fluid stream takes an askewed path. Thereafter, the fluid stream is flowed from the second flotation cell into the third flotation cell so that the fluid stream takes an askewed path. The method further includes flowing the fluid stream from the third flotation cell into the fourth flotation cell so that the fluid stream takes an askewed path.

An advantage of the present invention includes combining the teachings of a water skimmer device with the teachings of a gas flotation device. Another advantage is the use of retention time and gas flotation principles in order to adequately separate contaminants from an effluent. Yet another advantage is that with the use of the novel device and method, the separation efficiency increases. Another advantage is that use of the novel eductors allows for injection of a properly sized gas bubble array within the fluid stream.

Another advantage is that the invention herein disclosed requires a minimum of space for implementation. Yet another advantage is that the device and method herein discloses is more economical than prior art devices. Still yet another advantage is that the device and method may be safely used in remote areas such as offshore waters.

A feature of the present invention is use of the eductor with the water skimmer member. Another feature of the present invention is the rotor blades used in conjunction with the eductor in the water skimmer member and the gas flotation device. Another feature is use of multiple blade members with projections extending therefrom for the creation of properly sized and spaced gas bubbles to be injected within the effluent. Yet another feature is the utilization of the venturi principle with the nozzle, port and entrained gas to create the dispersed lifting bubble array. Still yet another feature is the use of safety level switches to determine the level of the fluid within the vessel, and to signal a discharge valve to open once a predetermined level has been reached.

Another feature is the coalescing plate pack used in the water skimmer. Yet another feature is that the gas flotation cells contain coalescing screens and baffles. Still yet another feature includes the baffle passage pattern that in turn causes a curved flow of the effluent through the vessel.

DETAILED DESCRIPTION OF THE PREFERRED EMBODIMENTS

Figure 1:
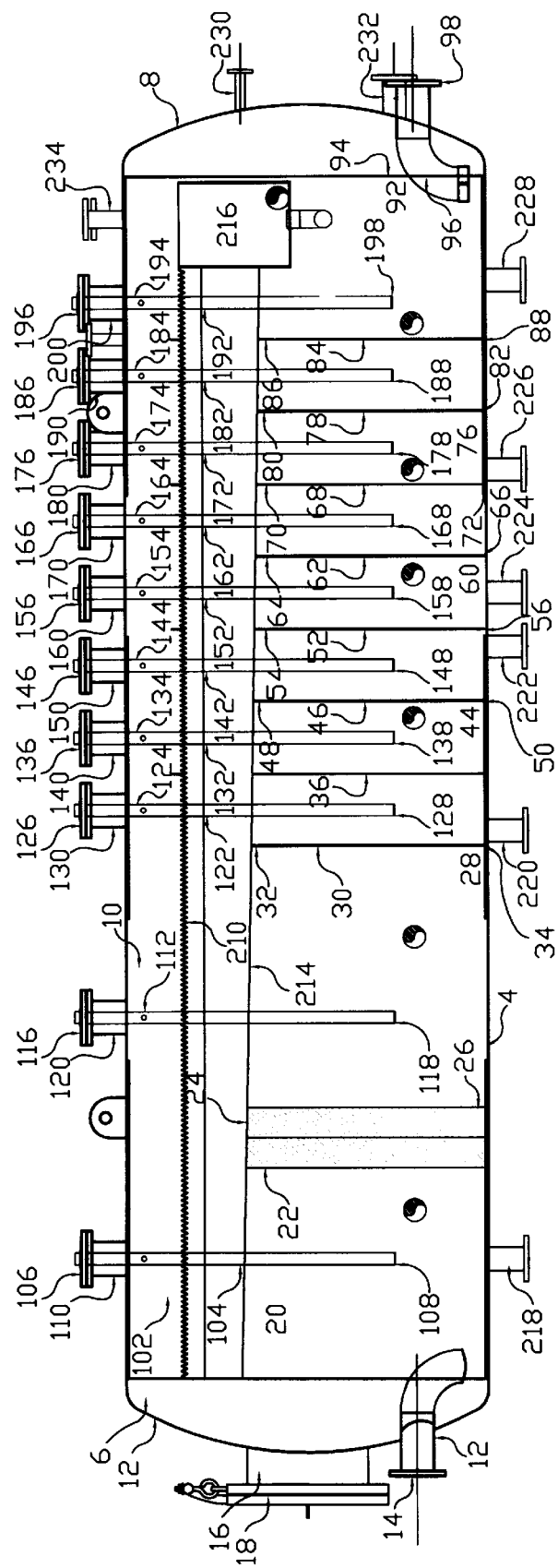
FIG. 1 is cross-sectional view of the vessel of the present invention.

Referring now to FIG. 1, the apparatus 2 of the present invention will now be described. The apparatus 2 includes the vessel 4 that has the first end 6, the second end 8, and the internal chamber 10. As depicted in the preferred embodiment, the vessel 4 is an elongated longitudinal cylindrical member. However, other varieties of vessels, such as vertical vessels, are possible with the teachings of the present invention.

As shown in FIG. 1, the first end 6 will have a concave contour with a fluid stream inlet projection 12, which is a cylindrical member projecting from the first end 6, with the water inlet 12 having a flange member 14 thereon for appropriate connection with a fluid line. The fluid stream will be an effluent that contains a water composition and contaminants. The contaminants may include hydrocarbons. The fluid stream may be a produced effluent from a subterranean reservoir such as a well completed to a hydrocarbon reservoir. The first end 6 may also contain the man way 16, with the man way 16 containing a cover and flange 18. The man way 16 provides a passage for equipment and personnel in order to perform maintenance, cleaning, etc.

The internal chamber 10 will now be described. The vessel 4 will contain a retention chamber 20 for retaining the fluid stream for separation of the water and contaminants (the retention chamber 20 may also be referred to as the water skimmer). The retention chamber 20 will receive the fluid stream from the fluid inlet 12. The retention chamber 20 also contains the coalescing plate pack member 22. In the preferred embodiment, the plate pack member 22 contains a series of plastic plates, arranged in back-to-back order, that work to coalesce the contaminants.

Therefore, the fluid stream will travel through the plate pack 22. As the oil particles strike the coalescing plate, the dispersed oil tends to combine and consolidate together which will have beneficial separation effects as is understood by those of ordinary skill in the art. The plate pack member 22 is commercially available from Performax Company. In the preferred embodiment, two packs are utilized in a series arrangement. The plate pack member 22 will contain a top end 24 and a bottom end 26, with the bottom end being connected to the underside of the vessel 4 so that the fluid stream is directed through the plate pack member 22.

The vessel 4 also contains a series of gas flotation cells arranged in a cascading fashion i.e one after the other. As seen in FIG. 1, the first gas flotation cell 28 will receive the fluid stream from the retention chamber 20. The first gas flotation cell 28 contains the screen member 30 that has the first end 32 and the second end 34, with the second end 34 being attached to the underside of the vessel 4 so that the fluid stream flowing through the vessel 4 will travel through the screen. The screen will have a plurality of openings therein. The screen 30 is attached to the vessel so that the fluid stream flows therethrough. As those of ordinary skill in the art will understand, the screen also causes a coalescing action by the contaminants striking the screen so that the contaminants (hydrocarbons or other impurities) are separated from the water phase.

Figure 4B:
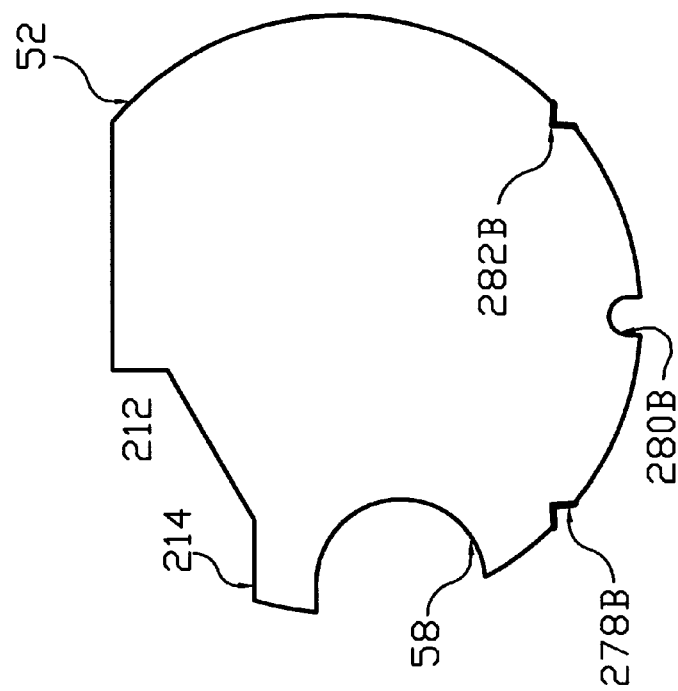
FIG. 4B is a partial front view of the second baffle plate disclosed herein.
Figure 4A:
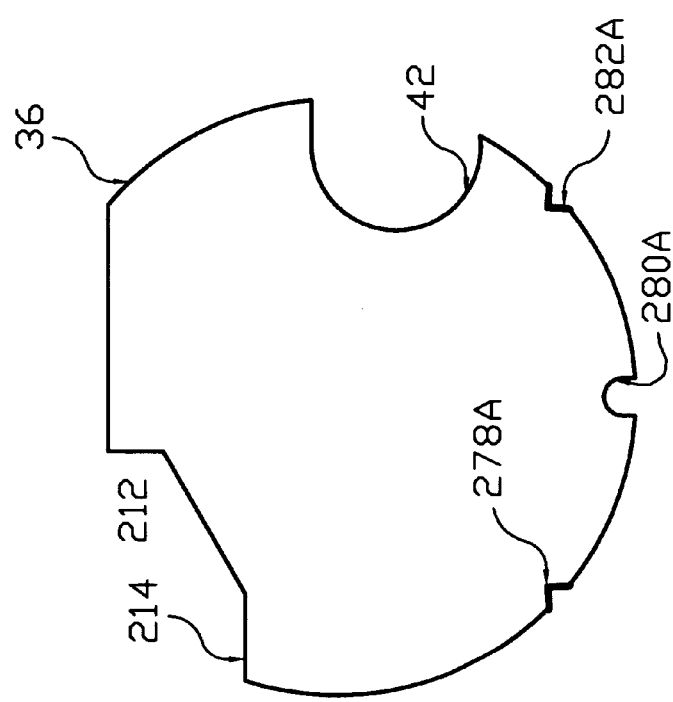
FIG. 4A is a partial front view of the first baffle plate disclosed herein.

The first gas flotation cell 28 also contains the baffle plate member 36, with the baffle plate member 36 having a first end 38 and the second end 40, with the second end 40 being attached to the underside of the vessel 4. The baffle plate member 36 is adapted to the vessel 4 so that the fluid stream flows therethrough. The baffle plate member 36 contains a passage 42 that is formed therein so that the fluid stream may be delivered to the second gas flotation cell 44 (the passage is the cut-out section of the baffle 36 that is seen in FIG. 4A).

The first gas flotation cell 28 and the second gas flotation cell 44 are arranged in series such that the fluid stream that exits cell 28 enters cell 44 via the passage 42. Thus, the second gas flotation cell 44 contains the screen 46 which is similar in construction as screen 30. The screen 46 has a first end 48 and a second end 50, with the second end 50 being attached to the underside of the vessel 4. The screen 46 is adapted to the vessel 4 so that the fluid stream flows therethrough. Also contained within the second cell 44 is the second baffle plate member 52, with the baffle plate member 52 having a first end 54 and a second end 56. The second end 56 is attached to the underside of the vessel 4. The baffle plate 52 will contain the passage 58 (the passage is a cut-out section of the baffle 52 that is seen in FIG. 4B). The baffle plate 52 is adapted to the vessel so that the fluid stream is directed through the passage 58 into the third gas flotation cell 60.

Figure 4D:
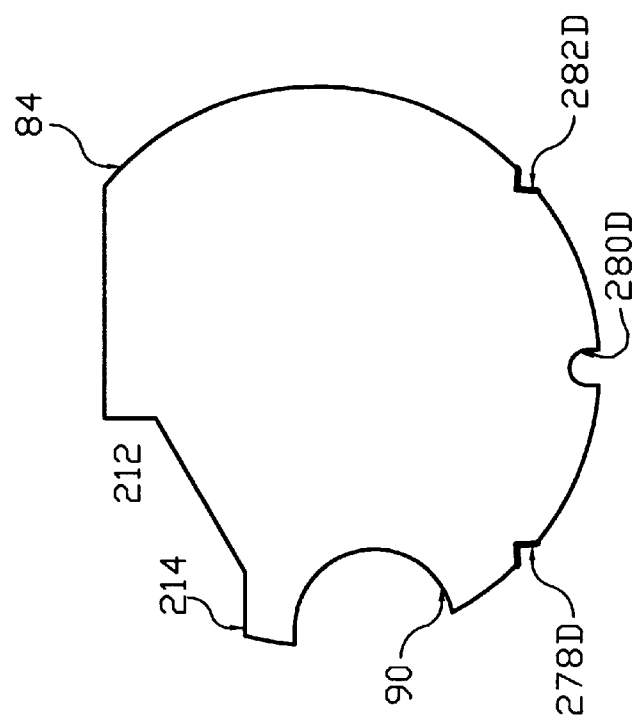
FIG. 4D is a partial front view of the fourth baffle plate disclosed herein.
Figure 4C:
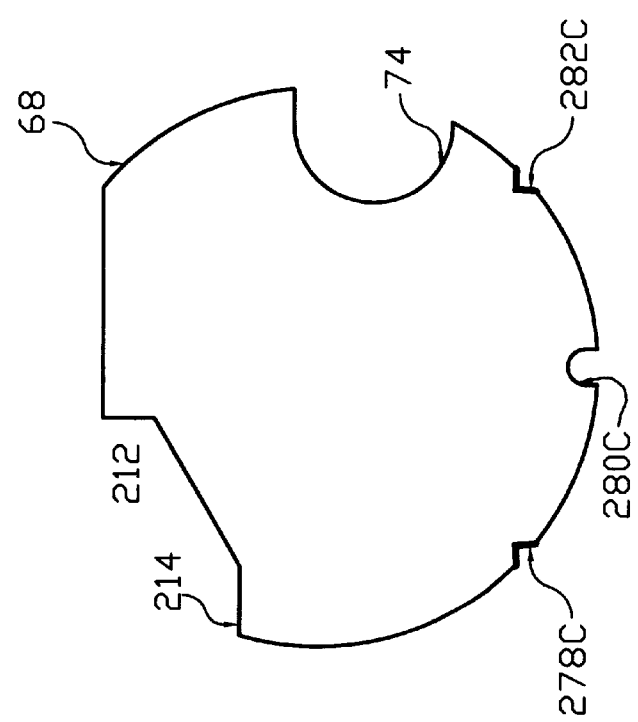
FIG. 4C is a partial front view of the third baffle plate disclosed herein.

The second gas flotation cell 44 and the third gas flotation cell 60 are arranged in series such that the fluid stream that exits cell 44 enters cell 60 via the passage 58. Thus, the third gas flotation cell 60 contains the screen 62 which is similar in construction as screen 30, and 46. The screen 62 has a first end 64 and a second end 66, with the second end 66 being attached to the underside of the vessel 4. The screen 62 is adapted to the vessel so that the fluid stream flows therethrough. Also contained within the third cell 60 is the third baffle plate member 68, with the baffle plate member 68 having a first end 70 and a second end 72. The second end 72 is attached to the underside of the vessel 4. The baffle plate 68 will contain the passage 74 (the passage is the cut-out section of the baffle 68 that is seen in FIG. 4C). The baffle plate 68 is adapted to the vessel so that the fluid stream is directed through the passage 74 into the fourth gas flotation cell 76.

The third gas flotation cell 60 and the fourth gas flotation cell 76 are arranged in series such that the fluid stream that exits cell 60 enters cell 76 via the passage 74. Thus, the fourth gas flotation cell 76 contains the screen 78 which is similar in construction as screen 30, 46, and 62. The screen 78 has a first end 80 and a second end 82, with the second end 82 being attached to the underside of the vessel 4. The screen 78 is adapted to the vessel so that the fluid stream flows therethrough. Also contained within the fourth cell 76 is the fourth baffle plate member 84, with the baffle plate member 84 having a first end 86 and a second end 88. The second end 88 is attached to the underside of the vessel 4. The baffle plate 84 will contain the passage 90 (the passage is the cut-out section of the baffle 84 that is seen in FIG. 4D). The baffle plate 84 is adapted to the vessel 4 so that the fluid stream is directed through the passage 86 into the fifth gas flotation cell 92.

The fifth gas flotation cell 92 will continue to the end plate 94, with end plate 94 having the opening 96 that will have placed therein the water outlet structure 97 for allowing the exiting of the fluid stream that has flowed through the vessel 4. As shown in FIG. 1, the water outlet structure 96 comprises a curved tubular member that will conclude at the flange member 98 for appropriate connection to a cooperating line.

The system herein disclosed further includes educator means, operatively associated with the gas blanket, for introducing a gas bubble array into the fluid stream. In the embodiment shown in FIG. 1, the first eductor means is shown generally at 102. The eductor member 102 will contain a tubular member 104, with the tubular member 104 having a first end 106 and a second end 108. The tubular member 104 enters the top side of the vessel 4 and extends therethrough. The first end 106 is encased in an outerjacket 110. The first end 106 is operatively associated with the header manifold which will be described in greater detail later in the application. Further, the eductor member 102 will contain a nozzle member and a port, both of which will be delineated in the description to FIGS. 2A, 2B, and 2C. The eductor 102 will also contain the rotor that will also be described with reference to FIGS. 6A, 6B, and 6C. The first eductor member 102 is positioned within the retention chamber 20. Therefore, the gas bubble array is produced within the retention chamber 20.

The system further contains a second eductor member 112 for introducing a gas bubble array into the fluid stream. The second eductor member 112 will contain a tubular member 114 having a first end 116 and a second end 118. The tubular member 114 enters the top side of the vessel 4 and extends therethrough as was the case with the first eductor member 102. The first end 116 is encased in an outer jacket 120 and is operatively associated with the header manifold which will be described in greater detail later in the application. Further, the eductor member 112 will contain a nozzle member and a port, both of which will be delineated in the description to FIGS. 2A, 2B, and 2C. The eductor 112 will also contain the rotor that will be described with reference to FIGS. 6A, 6B, and 6C. The second eductor member 112 is positioned within the first gas flotation cell 28 so that a gas bubble array is produced within the first gas flotation cell 28.

Arranged in series is a third eductor member 122 for introducing a gas bubble array into the fluid stream. The third eductor member 122 will similarly contain a tubular member 124 having a first end 126 and a second end 128. The tubular member 124 enters the top side of the vessel 4 and extends therethrough. The first end 126 is encased in an outer jacket 130 and is operatively associated with the header manifold. Further, the eductor member 122 will contain a nozzle member and a port. The third eductor member 122 is positioned within the first gas flotation cell 28 so that a gas bubble array is produced within the first gas flotation cell 28.

The system further contains a fourth eductor member 132 for introducing a gas bubble array into the fluid stream. The fourth eductor member 132 will similarly contain a tubular member 134 having a first end 136 and a second end 138. The tubular member 134 enters the top side of the vessel 4 and extends therethrough. The first end 136 is encased in an outerjacket 140 and is operatively associated with the header manifold. Further, the eductor member 132 will contain a nozzle member, a port and rotor. The fourth eductor member 132 is positioned within the second gas flotation cell 44 thereby producing a gas bubble array within the second gas flotation cell 44.

Further arranged in series is a fifth eductor member 142 for introducing a gas bubble array into the fluid stream. The fifth eductor member 142 will similarly contain a tubular member 144 having a first end 146 and a second end 148. The tubular member 144 enters the top side of the vessel 4 and extends therethrough. The first end 146 is encased in an outer jacket 150 and is operatively associated with the header manifold. Further, the eductor member 142 will contain a nozzle member, rotor and a port. The fifth eductor member 142 is positioned within the second gas flotation cell 44 so that a gas bubble array is produced within the second gas flotation cell 44.

The system further contains a sixth eductor member 152 for introducing a gas bubble array into the fluid stream. The sixth eductor member 152 includes a tubular member 154 having a first end 156 and a second end 158. The tubular member 154 enters the top side of the vessel 4 and extends therethrough. The first end 156 is encased in an outerjacket 160 and is operatively associated with the header manifold. Further, the eductor member 152 will contain a nozzle member and a port. The sixth eductor member 152 is positioned within the third gas flotation cell 60 producing a gas bubble array within the third gas flotation cell 60.

FIG. 1 further depicts a seventh eductor member 162 in series. The seventh eductor member 162 will similarly contain a tubular member 164 having a first end 166 and a second end 168. The tubular member 164 enters the top side of the vessel 4 and extends therethrough as was the case with the first eductor member 102. The first end 166 is encased in an outer jacket 170 and is operatively associated with the header manifold. Further, the eductor member 162 will contain a nozzle member, rotor and a port. The seventh eductor member 162 is positioned within the third gas flotation cell 60 so that the gas bubble array is produced within the third gas flotation cell 60.

As can be seen in FIG. 1, an eight eductor member 172 for introducing a gas bubble array into the fluid stream is included. The eight eductor member 172 will similarly contain a tubular member 174 having a first end 176 and a second end 178. The tubular member 174 enters the top side of the vessel 4 and extends therethrough. The first end 166 is encased in an outer jacket 180 and is operatively associated with the header manifold. Further, the eductor member 172 will contain a nozzle member, rotor and a port. The eight eductor member 172 is positioned within the third gas flotation cell 60 thereby producing a gas bubble array therein.

Further, a ninth eductor member 182 is shown for introducing a gas bubble array into the fluid stream, the member 182 containing a tubular member 184 with a first end 186 and a second end 188. The tubular member 184 enters the top side of the vessel 4 and extends therethrough as was the case with the first eductor member 102. The first end 186 is encased in an outer jacket 190 and is operatively associated with the header manifold. Further, the eductor member 182 will contain a nozzle member, rotor and a port. The ninth eductor member 182 is positioned within the third gas flotation cell 60 for producing a gas bubble array.

The system further contains a tenth eductor member 192 for introducing a gas bubble array into the fluid stream containing a tubular member 194 with a first end 196 and a second end 198. The tubular member 194 enters the top side of the vessel 4 and extends therethrough as was the case with the first eductor member 102. The first end 196 is encased in an outer jacket 200 and is operatively associated with the header manifold. Further, the eductor member 192 will contain a nozzle member, rotor and a port. The tenth eductor member 192 is positioned within the fifth gas flotation cell 60 for producing a gas bubble array.

FIG. 1 also discloses a weir 210 that is contained within the internal compartment of the vessel 4. The weir 210 is positioned longitudinally within the vessel 4. The weir 210 serves as a hurdle over which the separated fluid stream rises. In other words, the weir 210 serves as the level to which the fluid stream will spill over into the oil trough 212. The spillage into the trough 212 represents the contaminants which have been brought to the surface via the separation technique of the screens, baffles, plate packs, and gas bubble array. The oil trough 212 (also seen with reference to FIGS. 4A–4D) also travels the longitudinal length of the vessel 4.

Therefore, the fluid stream may spill over the weir into the oil trough 212 from the water retention chamber or any of the gas flotation cells. The base 214 is directed downward so as to gravity direct the spillage to the oil bucket pan 216.

The system will further contain the plurality of drains, including the drain 218 associated with the retention chamber 20, the drain 220 associated with the cell 28, the drain 222 associated with the cell 44, the drain 224 associated with the cell 60, the drain 226 associated with the cell 76 as well as the drain 228 associated with the cell 92. The embodiment of FIG. 1 will also have an oil outlet 230 for providing a passage for the oil out of the oil bucket pan 216 as well as an outlet 232 that may be connected to a pumping means for pumping the fluid from the oil bucket pan 216. This embodiment may also contain a pressure safety valve 234 for releasing pressure and/or gas from the vessel 4. It should be noted that 232 is the pump suction for recirculation.

Figure 2B:
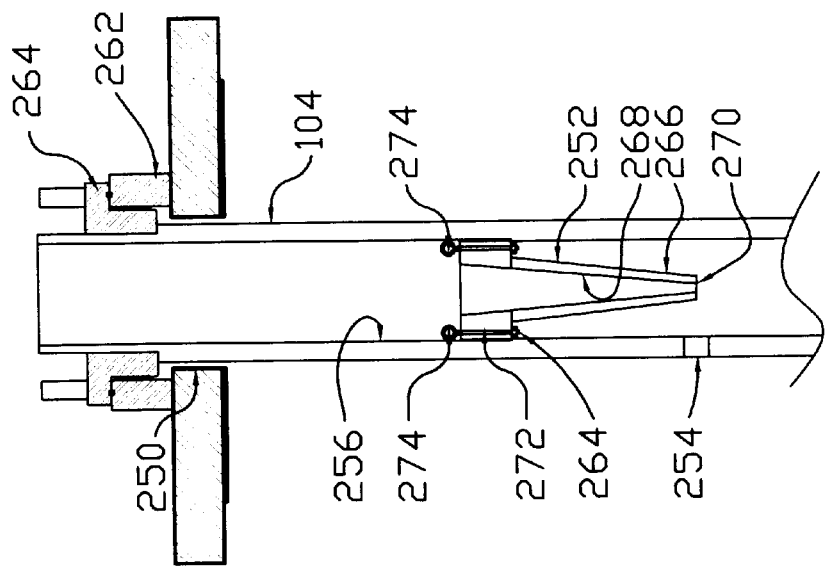
FIG. 2B is an enlarged cross-sectional view of the nozzle and port seen in FIG. 2A.
Figure 2A:
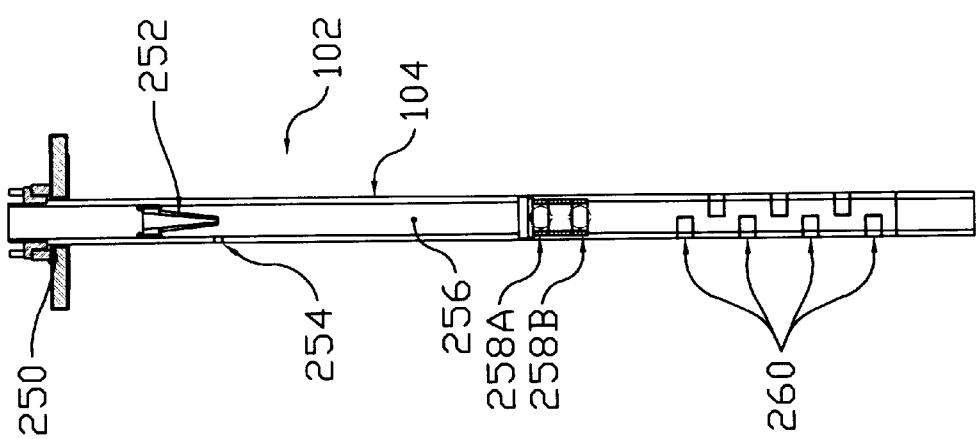
FIG. 2A is a cross-sectional view of the eductor member including the nozzle, port and rotor of the present invention.
Figure 6B:
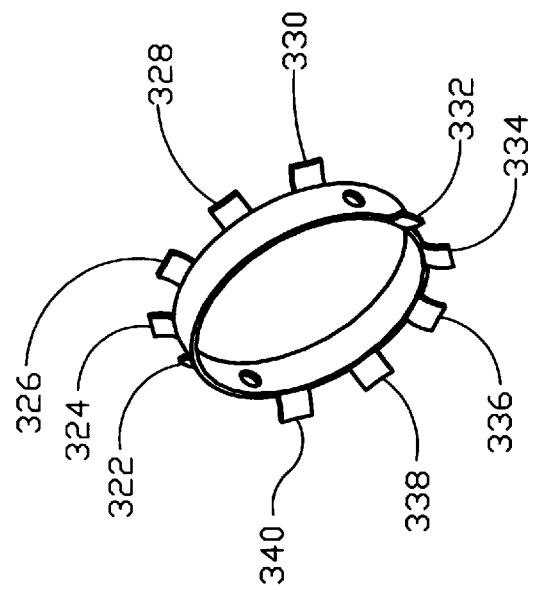
FIG. 6B is an illustrated view of a single blade band.
Figure 6A:
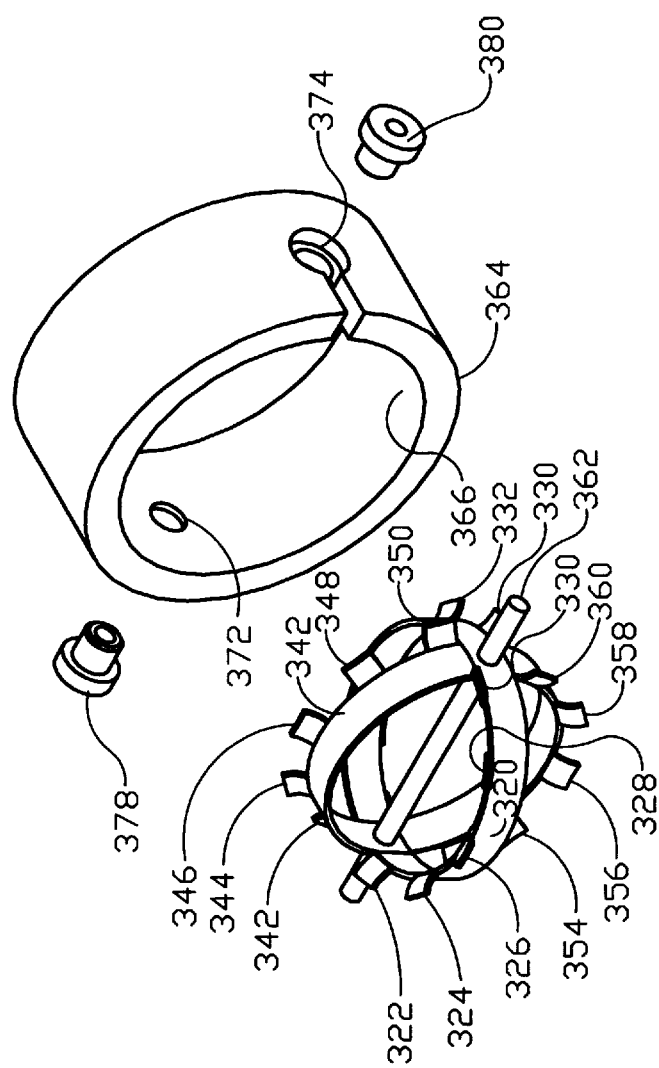
FIG. 6A is an exploded view of the rotor member of the present invention.
Figure 6D:
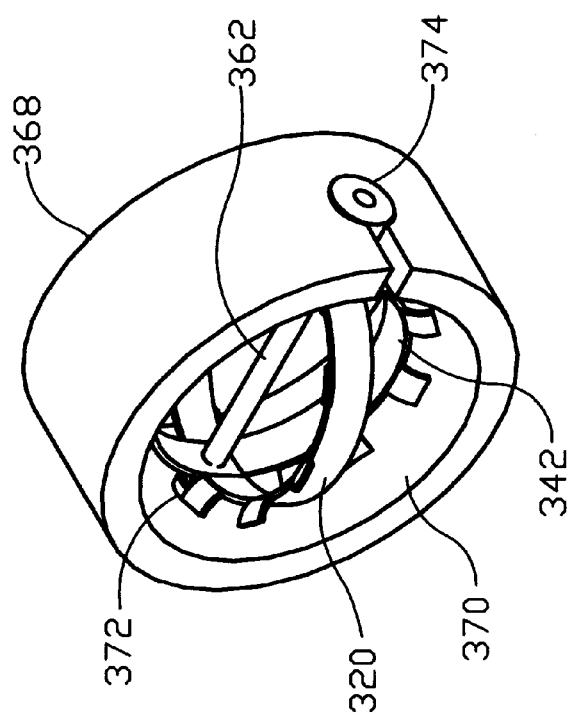
FIG. 6D is a perspective view of the rotor member of FIG. 6A.
Figure 6C:
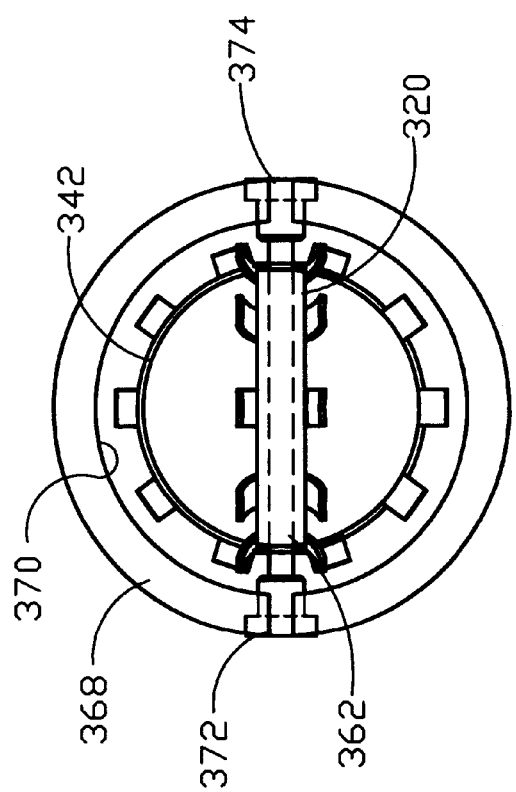
FIG. 6C is a front view of the rotor member of FIG. 6A.

Referring now to FIG. 2A, a cross-sectional view of the eductor member including the nozzle, port and rotor of the present invention will now be described. The eductor members 102, 112, 122, 132, 142, 152, 162, 172, 182, and 192 are of similar construction. While the description pertains to eductor 102, the following comments are applicable to the various eductors. It should also be noted that like numbers appearing in the various figures refer to like components. Referring to FIG. 2, the top of the vessel 4 will have the opening 250 with the tubular member 104 positioned therein. The tubular member 104 has contained therein the nozzle 252 as well as the port 254. The port 254 is positioned so that the gas in the gas blanket can communicate with the internal diameter 256 of the tubular member 104 via port 254. The eductor member 102 will also include the turbo rotors 258A, 258B. The turbo rotors are also seen in FIGS. 6A, 6B, 6C. The eductor member 102 also contains the plurality of openings 260 which provides an opening from the internal diameter 256 of the tubular member 102 to the outer diameter and into the fluid stream. It should also be noted that discharged effluent from the eductors may escape from the open end 108. The numeral 259 represents the bottom of the vessel, with the end 108 being disposed within the fluid stream.

Referring now to FIG. 2B, an enlarged cross-section of the tubular member 104 with nozzle 252 positioned therein is disclosed. As shown, the opening 250 includes the vessel collar 262 that is operatively associated with the down collar 264 for sealingly engaging the tubular member with the vessel. The internal diameter 256 of the tubular member 104 will contain a lip 264. The nozzle 252 contains a convex outer surface 266 with a similar inner surface 268 progressing to the nozzle exit 270 thereby forming the nozzle 252. The nozzle 252 further contains the shoulder 272, with the shoulder 272 cooperating to engage the lip 264 so that the nozzle 252 rest on said lip 264. The shoulder 272 will also have placed therethrough the latch loops 274. The latch loops 274 may be used for placement in order to locate the nozzle 252 therein, or alternatively, to remove the nozzle 252.

The FIG. 2B also depicts the port 254. Thus, the injected fluid will enter the nozzle 252 and in turn exits the nozzle at the nozzle tip 270. The nozzle will cause the injected fluid to exit at an increased velocity and also reduce the pressure at the tip. Due to the venturi effect, the gas contained within the gas blanket of the vessel will be sucked into the port 254 and into the internal diameter 256 of the tubular member 104. As is understood by those of ordinary skill in the art, the gas will entrain with the liquid within the tubular member 104.

Figure 3:
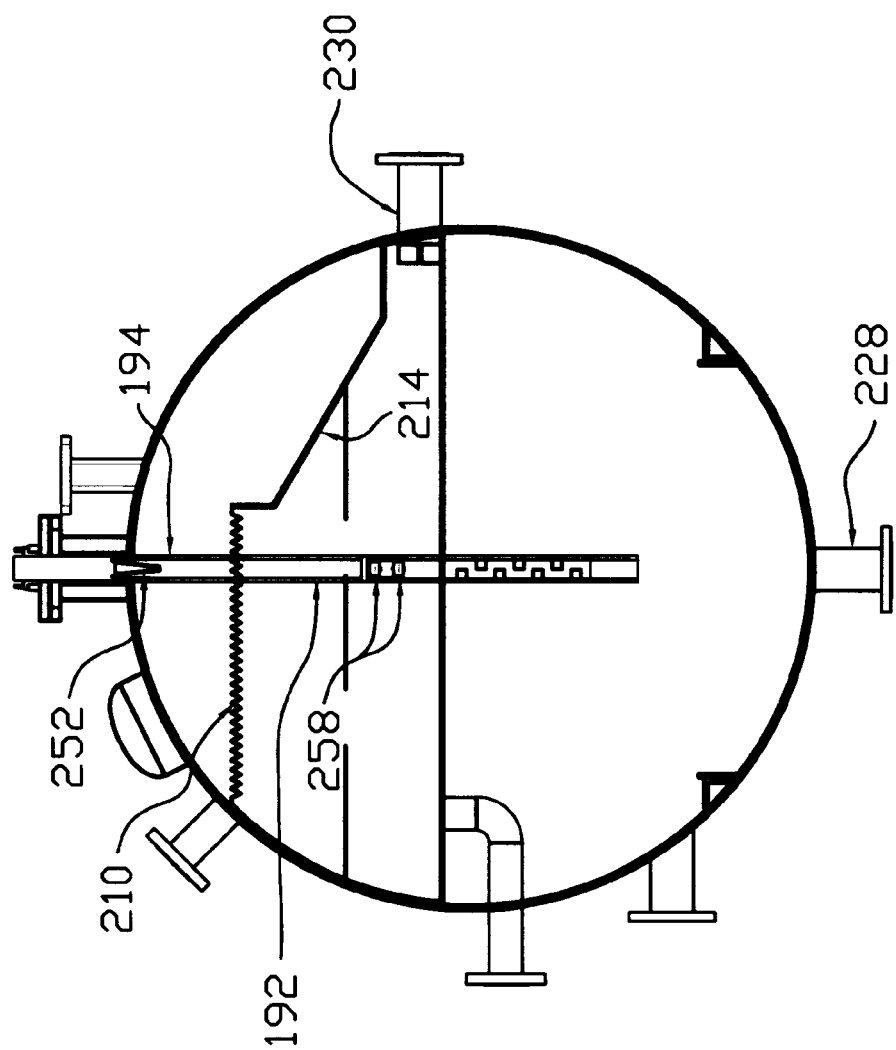
FIG. 3 is a cross-section of the eductor member of the present invention taken along line A—A of FIG. 1.

With reference to FIG. 3, the cross-section of the eductor member 192 taken from line A—A in FIG. 1 will now be described. Generally, the eductor member 192 contains the tubular member 194 and the nozzle 252. The FIG. 3 depicts the weir 210 along with the oil bucket trough 214. It should be noted that the operation of the invention will be described later in the application.

Referring now to FIGS. 4A, 4B, 4C, and 4D, an illustrated view of the baffle plates will now be described. Generally, FIG. 4A depicts the baffle plate member 36 with the passage 42 formed therein. Also represented in FIG. 4A is the cut-out section for the oil trough 212 along with the oil trough base 214. The cut-out sections 278A, 280A, and 282A allow for placement of the ribs placed along the underside of the vessel 4. FIG. 4B depicts the baffle plate member 52 with the passage 58 formed therein. Also represented in FIG. 4B is the cut-out section for the oil trough 212 along with the oil trough base 214. The cut-out sections 278B, 280B, and 282B allow for placement of the ribs placed along the underside of the vessel 4.

FIG. 4C depicts the baffle plate member 68 with the passage 42 formed therein. Also represented in FIG. 4C is the cut-out section for the oil trough 212 along with the oil trough base 214. The cut-out sections 278C, 280C, and 282C allow for placement of the ribs placed along the underside of the vessel 4. Referring now to FIG. 4D, the baffle plate member 84 with the passage 90 is shown. As mentioned earlier, the cut-out section for the oil trough 212 along with the oil trough base 214 is shown, along with the cut-out sections 278D, 280D, and 282D. As constructed, the fluid stream within the vessel will have an askewed path through the various flotation cells i.e. the fluid stream travels a curved route from the vessel inlet to the vessel outlet.

Figure 5:
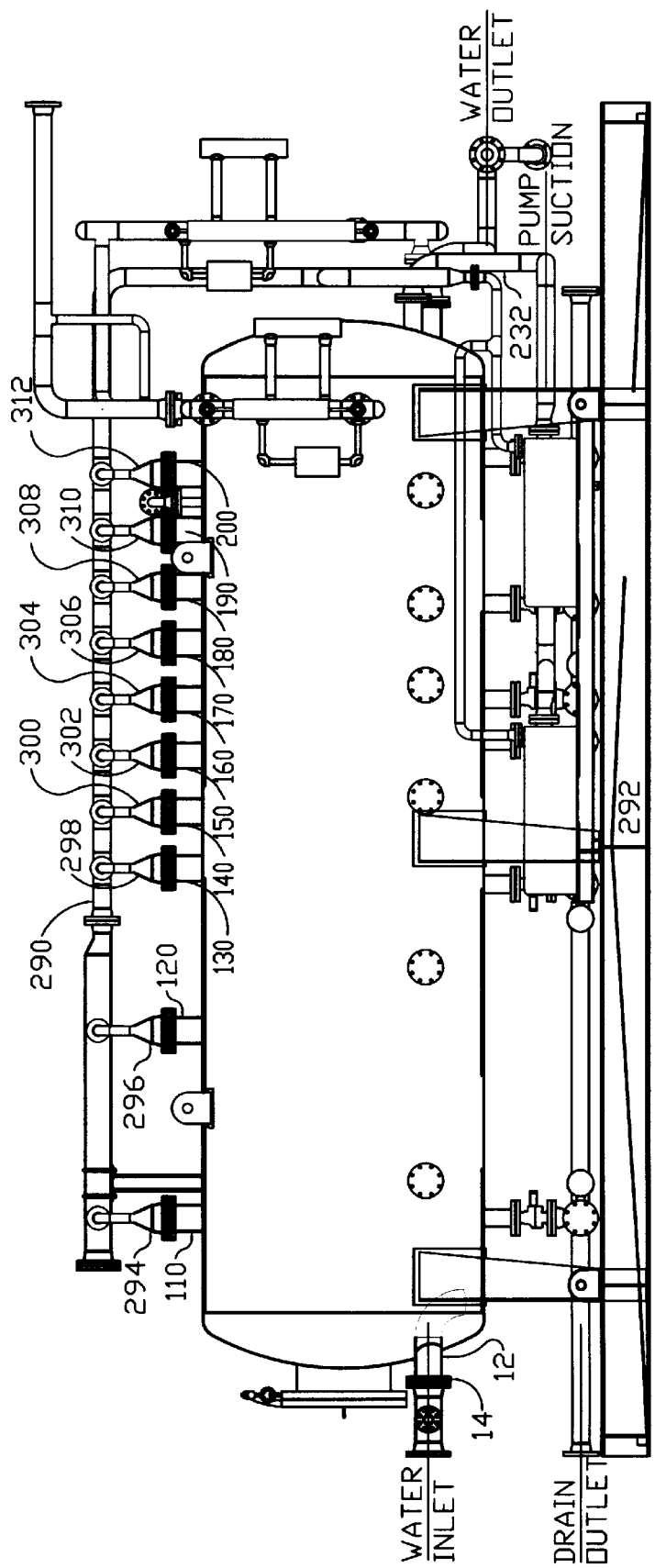
FIG. 5 is an illustrated view of the vessel and associated outer components.

With reference to FIG. 5, an illustrated view of the vessel 4 with outer piping layout will now be described. The apparatus 2 includes the header manifold 290. The header manifold 290 is operatively associated with the individual eductor members as will be more fully set forth. As can be seen with reference to FIGS. 1 and 5, vessel 4 has extending therefrom the pump suction line 232. The pump suction line is associated with the water phase of the vessel as was previously set forth. The pump means, operatively associated with the pump suction line 232, for receiving the fluid stream from the pump suction line 232 and pumping the fluid stream to the header manifold 290 is seen generally at 292. A back-up pump may be provided, although not shown. The fluid stream exits the vessel via the pump suction line 232 and into the pump 292.

The pump 292 will thereafter drive the fluid stream via the outlet line 295 into the header manifold 290 which in turn injects the recirculated fluid stream through the individual eductors. The header manifold contains the individual covers 294, 296, 298, 300, 302, 304, 306, 308, 310, 312, and 314. The covers 294–314 fluidly connect the header manifold to the eductor members. Therefore, the cover 294 connects with the eductor 102, the cover 296 connects with the eductor 112, the cover 298 eductor 122, the cover 300 connects with the eductor 132, the cover 302 connects with the eductor 142, the cover 304 connects with the eductor 152, the cover 306 connects with the eductor 162, the cover 308 connects with the eductor 172, the cover 310 connects with the eductor 182, and the cover 312 connects with the eductor 192.

FIG. 5 also depicts the oil level control switch 316 that is operatively connected to the oil bucket pan 216. The oil level control switch 316 detects the level of the oil within the oil bucket pan 216. Once the level reaches a predetermined level within the pan 216, a signal is sent to the switch 216 so that the oil may be evacuated from the pan 216. The switch is commercially available from the Fisher Company. A water level controller means 318, operatively attached to the vessel, for measuring the level of the fluid stream within the vessel and producing a signal once the fluid stream level reaches a predetermined level may also be provided. A dump valve controller may also be included which contains means, connected to the outlet valve, for receiving the output signal from the level controller means and opening the outlet valve so that the fluid stream exits the vessel. The water level switch 318 is operatively associated with the fifth gas flotation cell 92 ??? so that the water level switch 318 detects the water level within said fifth gas flotation cell 92. Once the level reaches a predetermined level within the cell 92, a signal is sent to the switch 318 so that the fluid stream within the vessel 4 may ve evacuated via water outlet 232. The switch 318 is commercially available from the Fisher Company. Both the level controller means and the dump valve controller means are well known in the art and may be commercially purchased from Fisher Company.

The rotor members 258A and 258B will now be described with reference to FIGS. 6A, 6B, 6C and 6D. As shown in FIG. 6A, the rotor 258A is presented in an exploded view. Thus, the rotor 258A comprises a first blade member 320 that in the preferred embodiment is essentially a hemispherical band 320, with the band containing a series of projections 322, 324, 326, 328, 330 on one half of the band 320 that are oriented in a first direction and a series of projections 332, 334, 336, 338, 340 on the other half of the band 320 that are oriented in a second direction. The rotor 258A also contains the second blade member 342 that is essentially similar to the circular band 320, with the blade band containing 342 series of projections 343, 344, 346, 348, 350 that are oriented in a first direction and a series of projections 352, 354, 356, 358, 360 that are oriented in a second direction. In the preferred embodiment, the projections are inclined at an angle of approximately 90 degrees. The FIG. 6B depicts the single blade band 320 with the projections 322–330 oriented in a first direction along one half of the single blade band 320 and the projections 332–340 oriented in a second direction along the other half of the single blade band 320.

Referring again to FIG. 6A, the rotor 258 further contains a center shaft 362. In the preferred embodiment, the first circular blade member 320 and the second circular blade member 342 are out of phase 90 degrees. The blades 320 and 342 are attached to the center shaft 362. According to the teachings of the present invention, only one blade member may be used with the center shaft 362, or alternatively, several blades may be employed. As shown, in the preferred embodiment, two circular blades are used. The center shaft 362 has a first end 364 and a second end 366.

The rotor member 258 also includes the collar 368 which is generally a tubular member having an inner diameter 370 and wherein the blades 320 and 342 (attached to shaft 362) are positioned within the inner diameter 370. The collar 368 will have an opening 372 and an opening 374. The collar 368 also contains the passage 376. Thus, in assembly, the blades 320, 342 and shaft 362 are placed within the inner diameter 370 via the passage 376. The end caps 378 and 380 are placed on the ends 372 and 374, respectfully. The shaft, with attached blades, are free to rotate within the collar.

The FIG. 6C depicts a front view of the rotor 258. Hence, the collar 368 has contained therein the blades 320, 342 about the shaft 362. The shaft 362 is attached to the collar 368 via caps 372, 374. In FIG. 6D, a perspective view of the assembled rotor 258 is illustrated. The blades 320, 342 form a partial cutting sphere According to the teachings of the present invention, the collar 368 is placed within the tubular member 104. Therefore, as the injected fluid and gas is forced down the tubular member 104 and into the collar, the blades 320, 342 will rotate along with the shaft 362. The projections 322 through 340 will further agitate the fluid and gas so that the gas bubbles are reduced to a satisfactory diameter and are adequately spaced apart. As the mixture of gas and fluid enters the collar 368, the first half of the blade 320 with projections will disperse the mixture, followed by the first half of blade 342 with projections, which in turn is followed by the first half of blade 342 with projections, which in turn is followed by the second half of the blade 320 with projections which in turn is followed by the second half of the blade 342. In the preferred embodiment, the individual eductors will contain a pair of rotors 258 as depicted in FIG. 2A as 258A and 258B. In the preferred embodiment, the distance between the rotors 258A & 258B is placed below the nozzle to effect the appropriate dispersion and separation and the distance will vary depending on the size of the unit.

In operation of the system herein disclosed, the operator introduces the fluid stream into the internal chamber of the vessel 4. The fluid stream flows through the vessel 4, and more particularly through the retention chamber wherein the oil is coalesced by the striking of the contaminants (oil in the preferred embodiment) within the fluid stream against the screen. The fluid stream is continued to be flowed into the first gas flotation cell and the method includes coalescing the oil in the fluid stream within the gas flotation cell.

The method further comprises recirculating the fluid stream that exited from the outlet back into the vessel via the eductors. Therefore, the operation continues by channeling the fluid stream into the first eductor means, and funneling the gas from the gas blanket into the first port and through the rotor so that a first gas bubble array is created within said retention chamber. The action of the novel eductor further aids in separating the oil from the water in the fluid stream within the retention chamber by producing a properly sized and spaced gas bubble array. The method further includes channeling the water into the second eductor means, and in turn funneling the gas from the gas blanket into the second port and through the rotor so that a properly sized and spaced gas bubble array is produced. This action creates the second gas bubble array within the gas flotation cell which in turn separates the oil from the water in the fluid stream within the gas flotation cell.

The method includes measuring the fluid stream level within the vessel and producing a signal once the fluid stream reaches the predetermined level which in turn discharges the fluid from the vessel. As noted earlier, the method includes flowing the fluid stream from the first flotation cell into the second flotation cell, then flowing the fluid stream into the third flotation cell, then into the fourth flotation cell, and into the fifth cell. The path takes the askewed path, through the passages 42, 58, 74, 90. The action of the individual eductors within the cells can be included in order to enhance separation of the oil from the fluid stream as previously mentioned.

Changes and modifications in the specifically described embodiments can be carried out without departing from the scope of the invention which is intended to be limited only by the scope of the appended claims.

We claim:

1. An apparatus for separating contaminants from a liquid stream comprising:

a vessel containing an internal chamber and a gas inlet, said vessel containing a gas blanket within said internal chamber, with said vessel containing a liquid stream inlet for receiving said liquid stream containing said contaminants and a liquid stream outlet for discharging the liquid stream having a reduced amount of contaminants;

a skimmer means, received within said internal chamber and adapted to receive the liquid stream containing said contaminants from said liquid stream inlet, for separating the contaminants from said liquid stream and providing an output, said skimmer means being disposed to release said liquid stream;

a first gas flotation cell contained within said vessel, said first gas flotation cell being adapted to receive the liquid stream from said skimmer means; and wherein said first gas flotation cell comprises a first screen member having a permeable structure; a plate baffle, said plate baffle having a first passage; an eductor means, operatively associated with the gas blanket, for introducing gas bubbles into said liquid stream in said vessel; and wherein said eductor means comprises an elongated tube operatively associated with said vessel, said tube being in communication with the outlet liquid stream having a reduced amount of contaminants; a nozzle member positioned within said elongated tube and adapted to receive the liquid stream having a reduced amount of contaminants, said nozzle member having an inner convex surface concluding at a nozzle tip so that the liquid stream having a reduced amount of contaminants accelerates upon exiting said nozzle member and creates a zone of low pressure at the nozzle tip; a port formed on said elongated tube and located adjacent the nozzle tip, said port being adapted to receive the gas contained within said gas blanket and introduce the gas into said elongate tube; a rotor member positioned within said elongated tube and adapted to disperse the gas within said elongated tube and wherein said rotor member comprises: a first collar operatively adapted to be positioned in said elongated tube; a first shaft having a first end and a second end and wherein said first end is rotably connected to said collar and said second end is rotably connected to said collar; a first blade attached to said first shaft, and wherein said first blade is rotated with said first shaft; a second blade attached to said first shaft, and wherein said second blade is rotated with said first shaft, and wherein said first blade contains a first projection extending therefrom and said second blade contains a second projection extending therefrom;

an oil bucket positioned within said vessel and adapted to receive a portion of said liquid stream having an increased amount of contaminants from said skimmer means and said first gas flotation cell.

2. The apparatus of claim 1 wherein said skimmer means comprises:

means for coalescing the contaminates contained within the liquid stream;

and wherein said volume of said skimmer means is sufficient to allow retention of the liquid stream for 20 minutes.

3. The apparatus of claim 2 wherein the liquid stream contaminated with an oil and wherein said coalescing means comprises:

a permeable member positioned within said vessel and adapted so that the liquid stream flows through said permeable member so that the oil contained within said liquid stream will coalesce, said permeable member being constructed of a plastic having a plurality of channels therethrough.

4. The apparatus of claim 3 further comprising:

a header manifold operatively associated with said elongated tube and adapted to deliver the liquid stream outlet containing a reduced amount of contaminants from the vessel outlet to said elongated tube;

pump means, operatively associated with the vessel outlet for pumping the liquid stream containing a reduced amount of contaminants to said header manifold.

5. The apparatus of claim 4 further comprising:

an outlet valve connected to said vessel outlet;

level controller means, operatively associated with said vessel outlet, for measuring the level of said liquid stream within said vessel and producing a signal once the liquid stream level reached a predetermined level;

dump valve controller means, connected to said outlet valve, for receiving said output signal from said level controller means and opening said outlet valve so that said liquid stream having a reduced amount of contaminants exits said vessel.

6. A system for separating contaminants contained within a liquid stream comprising:

a vessel containing an internal compartment, said vessel containing a gas phase, said vessel further containing a liquid stream inlet for receiving a liquid stream containing said contaminant and a liquid stream outlet for discharging the liquid stream having a reduced amount of contaminants;

a retention chamber, positioned within said internal compartment, for retaining said liquid stream, said retention chamber having disposed therein a liquid inlet adapted to receive the liquid stream having said contaminants therein and a fluid outlet adapted to release the liquid stream, and wherein said retention chamber contains a coalescing plate pack member adapted to allow flow of the liquid stream therethrough;

a first gas flotation cell contained within said internal compartment of said vessel, said first gas flotation cell being operatively associated with said liquid outlet of said retention chamber, and containing a first screen member and a baffle containing a first passage;

an eductor member which comprises an elongated tube operatively associated with said vessel, said tube being in communication with the outlet liquid stream having a reduced amount of contaminants; a nozzle member positioned within said elongated tube and adapted to receive the liquid stream having a reduced amount of contaminants, said nozzle member having an inner convex surface concluding at a nozzle tip so that the liquid stream having a reduced amount of contaminants accelerates upon exiting said nozzle member and creates a zone of low pressure at the nozzle tip; a port formed on said elongated tube and located adjacent the nozzle tip, said port being adapted to receive the gas contained within said gas blanket and introduce the gas into said elongate tube; a rotor member positioned within said elongated tube and adapted to disperse the gas within said elongated tube and wherein said rotor member comprises: a first collar operatively adapted to be positioned in said elongated tube; a first shaft having a first end and a second end and wherein said first end is rotably connected to said collar and said second end is rotably connected to said collar; a first blade attached to said first shaft, and wherein said first blade is rotated with said first shaft; a second blade attached to said first shaft, and wherein said second blade is rotated with said first shaft, and wherein said first blade contains a first projection extending therefrom and said second blade contains a second projection extending therefrom;

an oil bucket positioned within said vessel and adapted to receive a portion of said liquid stream having an increased amount of contaminants from said retention chamber and said first gas flotation cell;

a header manifold operatively associated with said eductor member;

pump means, operatively associated with the liquid stream outlet, for receiving said liquid stream having a reduced amount of contaminants therein from said fluid outlet and pumping said liquid to said header manifold, and wherein said header manifold allows injection of the liquid stream having a reduced amount of contaminants therein into said eductor member.

7. The system of claim 6 wherein said retention chamber comprises a volume that is sufficient to allow retention of the liquid stream for 20 minutes.

8. The system of claim 7 wherein said coalescing plate pack member comprises:

a porous member positioned within said vessel and adapted so that the liquid stream flows through said porous member so that an oil contained within said liquid stream will coalesce, said porous member being constructed of a plastic having a plurality of channels therethrough.

9. The system of claim 8 further comprising:

an outlet valve connected to said vessel outlet;

level controller means, operatively associated with said vessel, for measuring the level of said liquid stream within said vessel and producing a signal once the liquid stream level reaches a predetermined level;

dump valve controller means, connected to said outlet valve, for receiving said output signal from said level controller means and opening said outlet valve so that said liquid stream having a reduced amount of contaminants exits said vessel.

10. The system of claim 9 further comprising a second gas flotation cell containing a second baffle plate, a third gas flotation cell containing a third baffle plate, and fourth gas flotation cell containing a fourth baffle plate, and wherein said second gas flotation cell, said third gas flotation cell, and said fourth gas flotation cell are arranged in series relative to said first gas flotation cell, and wherein said screen and baffle plate of said first flotation cell has a first passage, said baffle plate of said second flotation cell has a second passage, said baffle plate of said third flotation cell has a third passage, and said baffle of said fourth flotation cell has a fourth passage, and wherein said first, second, third and fourth passages are offset relative to each other so that the liquid stream from said first gas flotation cell through said second gas flotation cell through said third gas flotation cell and through said fourth gas flotation cell travels and askewed path through the vessel.

11. The system of claim 6 wherein said eductor member further contains a second rotor positioned in series with said first rotor.

12. The system of claim 11 wherein said second rotor comprises:

a second collar operatively adapted to be positioned in said elongated tube;

a second shaft having a first end and a second end and wherein said first end of said second shaft is rotably connected to said second collar and said second end of said second shaft is rotably connected to said second collar;

a third blade attached to said second shaft, and wherein said third blade is rotated with said second shaft.

* * * * *